US011032523B2

(12) United States Patent
Loosli

(10) Patent No.: US 11,032,523 B2
(45) Date of Patent: Jun. 8, 2021

(54) AUTOMATED IMAGE METADATA PROCESSING

(71) Applicant: NCR Corporation, Duluth, GA (US)

(72) Inventor: Sean Paul Loosli, Mountain View, CA (US)

(73) Assignee: NCR Corporation, Atlanta, GA (US)

(*) Notice: Subject to any disclaimer, the term of this patent is extended or adjusted under 35 U.S.C. 154(b) by 0 days.

(21) Appl. No.: 15/364,631

(22) Filed: Nov. 30, 2016

(65) Prior Publication Data
US 2018/0152641 A1 May 31, 2018

(51) Int. Cl.
H04N 7/18 (2006.01)
H04W 4/18 (2009.01)
H04W 4/02 (2018.01)
G06Q 40/02 (2012.01)
G06T 7/70 (2017.01)

(52) U.S. Cl.
CPC ........... *H04N 7/185* (2013.01); *G06Q 40/025* (2013.01); *G06T 7/70* (2017.01); *H04W 4/026* (2013.01); *H04W 4/185* (2013.01)

(58) Field of Classification Search
CPC ......... G06F 17/30265; G06F 17/30268; G06F 17/3028; H04W 4/185; G01C 19/00–728; G08B 13/19671; G08B 13/19673; G06Q 20/401
USPC ......... 348/211.3, 231.3, 231.5, 231.6, 231.9; 396/49; 705/14.23, 26.64, 27.1, 26, 64; 725/114
See application file for complete search history.

(56) References Cited

U.S. PATENT DOCUMENTS

| | | | | |
|---|---|---|---|---|
| 2006/0187317 A1* | 8/2006 | Montulli | ............... | H04N 5/2251 348/231.5 |
| 2009/0171822 A1* | 7/2009 | Meadow | ................ | G06Q 20/10 705/30 |
| 2010/0153465 A1* | 6/2010 | Dasgupta | ........... | G06K 9/00624 707/802 |
| 2010/0260426 A1* | 10/2010 | Huang | ..................... | G06K 9/20 382/218 |
| 2010/0321489 A1* | 12/2010 | Chen | ...................... | G01C 11/02 348/116 |
| 2011/0052073 A1* | 3/2011 | Wallace | ............. | G06K 9/00704 382/190 |
| 2011/0320317 A1* | 12/2011 | Yuan | ................... | G06Q 30/0601 705/26.61 |
| 2012/0214515 A1* | 8/2012 | Davis | .................... | G10L 19/018 455/456.3 |
| 2013/0258117 A1* | 10/2013 | Penov | ................... | G06K 9/6202 348/207.1 |
| 2014/0279096 A1* | 9/2014 | Akin | .................... | G06Q 20/401 705/16 |
| 2014/0324823 A1* | 10/2014 | Iorio | ................. | G06F 17/30268 707/722 |

(Continued)

Primary Examiner — Xi Wang
(74) Attorney, Agent, or Firm — Schwegman Lundberg & Woessner, P.A.

(57) ABSTRACT

Software executing on a mobile device collects custom metadata for an image taken by a camera of a mobile device. The image with the custom metadata is sent from the software to an external network service. The external network service processes the custom metadata to at least determine a physical location of the image. In an embodiment, the physical location is used to uniquely identify the image and perform an automated transaction on behalf of a user that operates the mobile device.

17 Claims, 5 Drawing Sheets

(56) References Cited

U.S. PATENT DOCUMENTS

| | | | |
|---|---|---|---|
| 2015/0206218 A1* | 7/2015 | Banerjee | G06Q 30/0623 705/26.61 |
| 2015/0221151 A1* | 8/2015 | Bacco | G06K 9/00288 340/5.83 |
| 2016/0027091 A1* | 1/2016 | McGrath | G06Q 30/0633 705/26.8 |
| 2018/0101971 A1* | 4/2018 | Balasubramanian | G06F 16/9537 |

* cited by examiner

AUTOMATED IMAGE METADATA PROCESSING

BACKGROUND

Mobile devices are ever present in today's connected world. Individuals now operate these devices to transact with a variety of business over wireless networks. Moreover, mobile devices are used to capture images and videos for moments in a person's life. These devices are heavily integrated into the lives of individuals. Consequently, consumers are comfortable operating these devices and the devices are typically always in the possession of the consumers.

One area of consumer transactions that has not been automated to any significant degree is consumer loans. To a large extent, a consumer loan has actually become more complicated in the industry, since the financial collapse and imposition of more stringent government regulations.

For example, a home loan application can be repetitive, time consuming, and confusing for a consumer. However, much of the information needed to satisfy government regulators and internal mortgage risk analysts is capable of being obtained independent of the consumer. Yet, the consumer typically provides all of the needed information and sometimes multiple times to the mortgage company during the loan process.

SUMMARY

In various embodiments, methods and a system for automated image metadata processing are presented.

According to an embodiment, a method for automated image metadata processing is provided. Specifically, and in one embodiment, a current physical location of a mobile device is obtained and a compass setting for the mobile device is acquired. Next, the current physical location and the compass setting are recorded as metadata for an image taken by a camera of the mobile device. Finally, the image is transmitted with the metadata to a network service for processing.

DETAILED DESCRIPTION

Figure 1A:
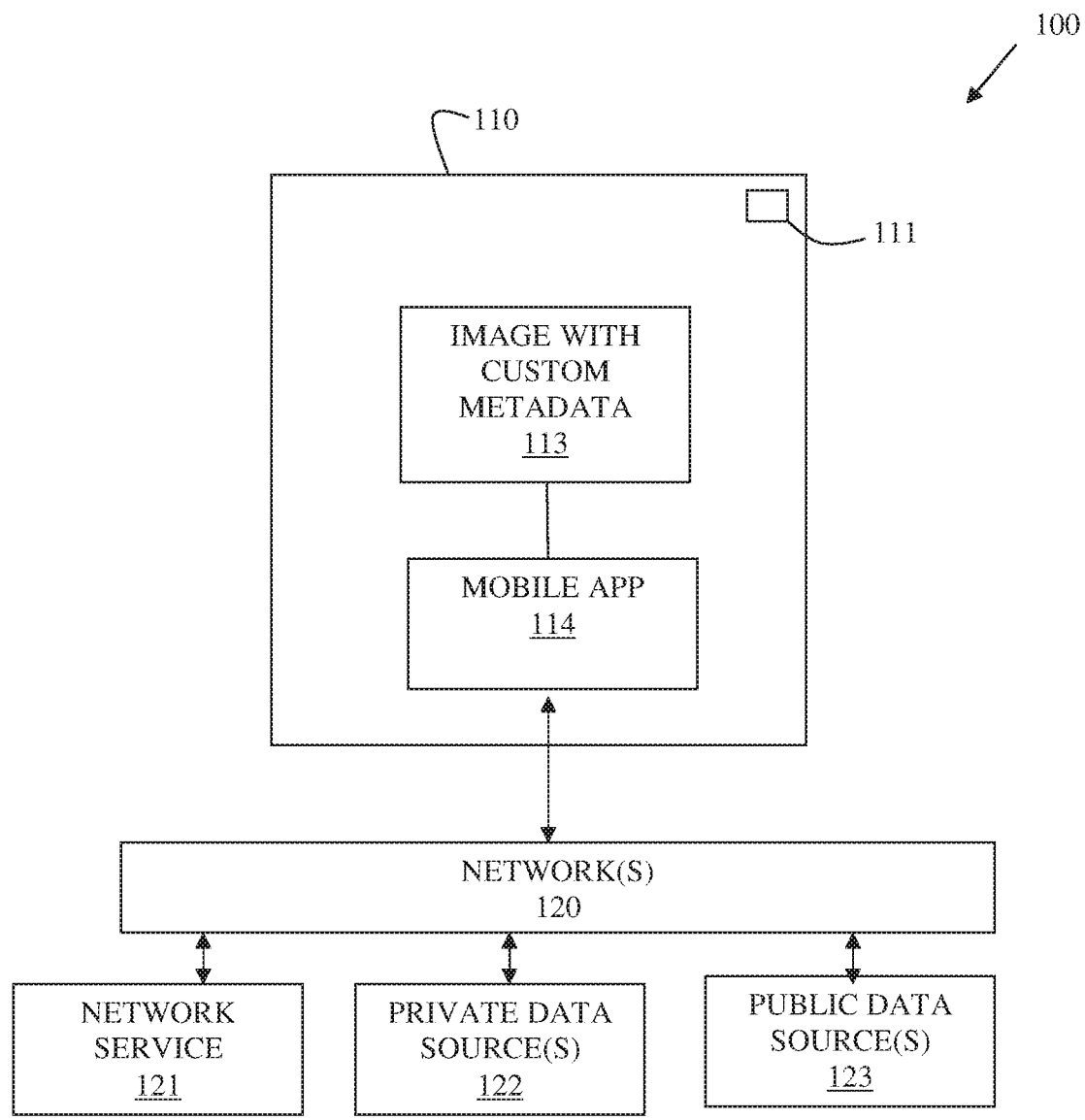
FIG. 1A is a diagram of a system for automated image metadata processing, according to an example embodiment.

FIG. 1A is a diagram of a system 100 for automated image metadata processing, according to an example embodiment. The system 100 is shown schematically in greatly simplified form, with only those components relevant to understanding of one or more embodiments (represented herein) being illustrated. The various components are illustrated and the arrangement of the components is presented for purposes of illustration only. It is to be noted that other arrangements with more or less components are possible without departing from the automated image metadata processing embodiments presented herein and below.

Moreover, various components are illustrated as one or more software modules, which reside in non-transitory storage and/or hardware memory as executable instructions that when executed by one or more hardware processors perform the processing discussed herein and below.

The techniques, methods, and systems presented herein and below for automated image metadata processing can be implemented in all, or some combination of the components shown in different hardware computing devices having one or more hardware processors.

The system 100 includes: a mobile device 110, a variety of networks 120, a network service 121, private data sources 122, and public data sources 123.

The mobile device 110 includes a camera 111, a digitally captured image with custom metadata 113, and a mobile application (app) 114.

The mobile app 114 interacts with the camera 111 and captures and records the image with the custom metadata 113. Moreover, the mobile app 114 wirelessly communicates over one or more networks 120 with a network service 121, such as a network service that provides the mobile app 114 for download, installation, and processing on the mobile device 110.

When the mobile app 114 is initiated and executed on one or more processors of the mobile device 110, an option is presented to the user (who is operating the mobile device 110) to capture an image of an object utilizing the integrated camera 111 of the mobile device 110. The user can utilize whatever features of the camera 111 that is natively available on the mobile device 110, such as zooming in, panning out, focusing, and the like.

The type of mobile device 110 and the features of the integrated camera 111 can be preconfigured as settings and made available to the mobile app 114. For example, the level of zooming, pixel quality (pixel density), level of panning, and the like. The settings for the camera 111 features may also be discovered or obtained by the mobile app 114 in real time as the user operates the camera 111 from the Operating System (OS) of the mobile device 110 or through an Application Programming Interface (API) processed by the mobile app 114 to access a camera driver processing on the mobile device 110 for the camera.

Thus, the mobile app 114 has preconfigured and real-time access to settings and features of the integrated camera 111. The mobile app 114 also has access to a variety of other integrated components of the mobile device 110, such as a compass, Global Positioning Satellite (GPS) receiver, and/or gyroscope. This can be achieved through interaction with the OS of the mobile device 110 and/or through APIs permitting interaction with the compass, GPS receiver, and/or gyroscope.

When the user initiates the mobile app 114 on the mobile device 110 and activates the user-interface option of the mobile app 114 for taking a picture (image), the mobile app 114 has access while the camera is operating to: real-time settings being changed interactively by the user when operating the camera 111 (such as zoom level, pan level, etc.), compass settings from the integrated compass (such as direction that the camera is focused (north, south, east, west, northeast, southwest, etc.), GPS readings for the mobile device 114 (such as longitude and latitude coordinates of the mobile device 114), and any available gyroscope settings (angle and orientation of the device relative to the horizontal surface of the earth). The mobile app 114 can also obtain settings from the OS of the mobile device 110 when the camera is being activated, such as current date, current time, and the like. The mobile app 114 also has access to a variety of preconfigured information for the user, such as user login identifier (id) (used by the user to log into the network service 121), mobile device id (phone number, Media Access Control (MAC) identifier, Internet Protocol (IP) address assigned to mobile device 110 for access to the network 120).

When the camera 111 takes the picture (image) as directed by the user from within the mobile app 114, the mobile app 114 collects a variety of metadata that is stored with the image 113 or stored separate from the image in a file that is linked to the image 113. This metadata includes, by way of example only: a current physical location of the mobile device 111 when the picture was taken (physical longitude and latitude coordinates for the mobile device), current compass direction settings, current gyroscope orientation settings, current camera settings at the time the picture was taken, current date, current time, user-related information (user id), device-related information (phone number, device id, MAC address, IP address).

The metadata is the stored with the image 113 (perhaps as header information) or stored in a separate file that is linked with the image 113.

The mobile app 114 may then present the image (picture) that was captured by the camera 111 and provide an interface option to the user to ask if the user would like to send the image with the custom metadata as presented to the user within the mobile app 114 or whether the user desires to take a new and different image. Once the user is satisfied with the image and sends the image to the network service 121 over the wireless network 120, a variety of additional automated image metadata processing can be achieved by the network service 121 upon receive of the image with the custom metadata 113. The network service 121 also interacts, when processing the image with the custom metadata 113 with a variety of private data sources 122 and public data sources 123 (some of which are discussed below with reference to the FIG. 1B). The interaction between the network service 121 and the private 122 and public 123 data sources occurs over the networks 120.

In an embodiment, the selected image can be saved and sent at a later time by the user from a different device than the mobile device 110. For example, the image with metadata is captured by the mobile device 110 and transferred to a different device operated by or accessible to the user. The user then sends the novel image with metadata to a service for automated user-related transaction processing on the metadata.

One example automated processing scenario is discussed below with reference to the FIG. 1B.

In an embodiment, the mobile device 110 is one of: a tablet, a wearable processing device (goggles, watch, etc.), a phone, a laptop, a network camera, and an intelligent appliance (having network communication capabilities with processing capabilities).

In an embodiment, the mobile app 114 is a modified version of a user's existing financial institution's mobile app having the enhanced processing discussed above for capturing the novel metadata with the image from within the mobile app 114.

In an embodiment, the networks 120 can include one or more of: cellular, WiFi (IP-based communications), Bluetooth®, Near Field Communication (NFC). In an embodiment, a wireless network 120 connects the mobile device 110 wirelessly to a wired Ethernet-based network.

Figure 1B:
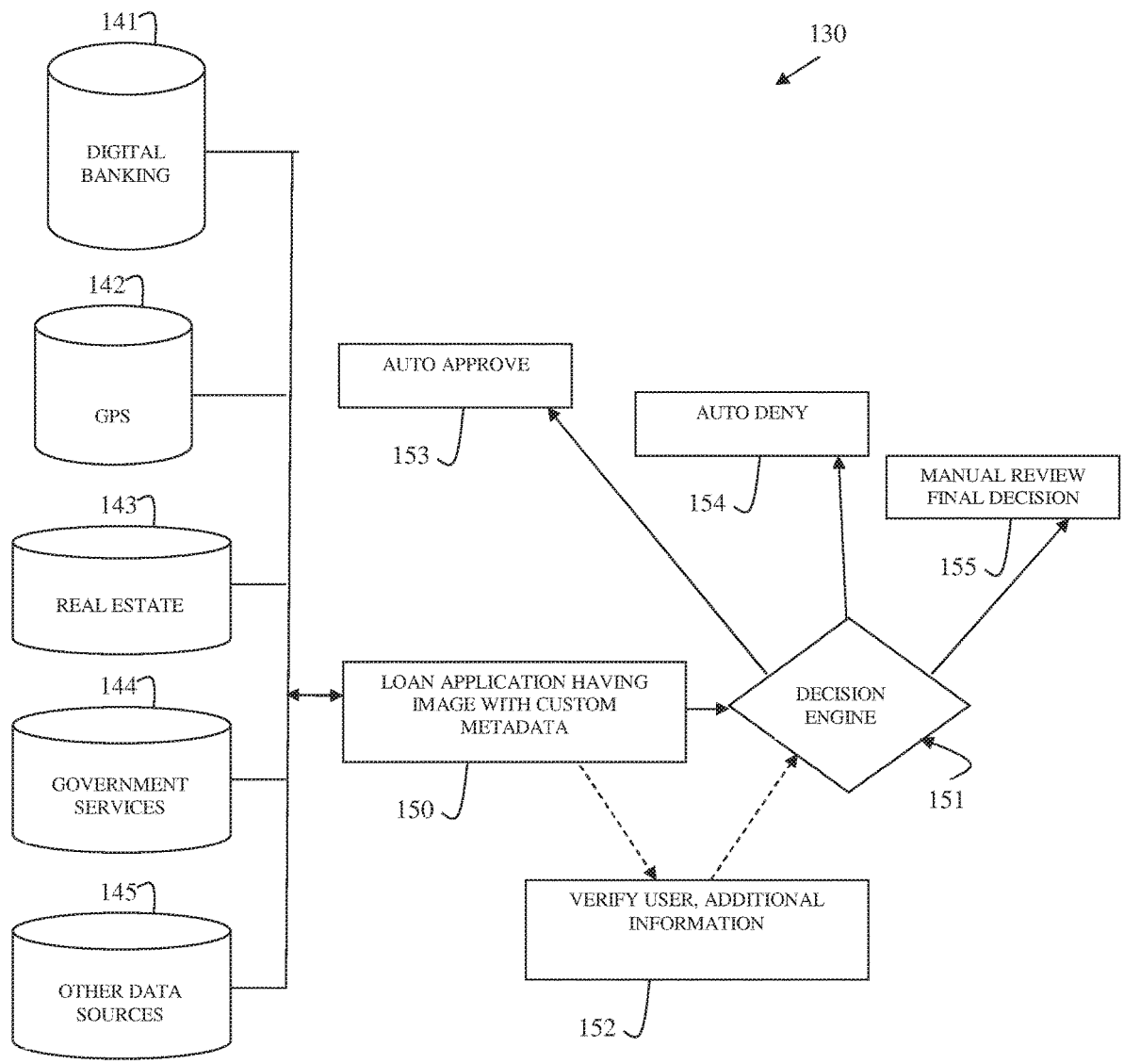
FIG. 1B is a diagram of a method for an example scenario for automated image metadata processing, according to an example embodiment.

FIG. 1B is a diagram of a method 130 for an example scenario for automated image metadata processing, according to an example embodiment. The method is implemented as executable instructions represented by software modules referred to as a "network service." The network service processes on one or more processors of a device. The network service has access to one or more networks, which include wireless networks and/or wired networks.

A user operates mobile device 110 and interacts with mobile app 114 to deliver the user-directed and recorded digital image with the custom metadata 113 to a network service 121 (identified in the method 130 as processing 150-155. The user interaction is with a network service 121 as identified in the FIG. 1B for applying for a home loan to purchase a house. It is noted that other network services can be modified for performing automated image metadata processing for a variety of other types of transactions with a user. Therefore, the processing scenario shown for an automated home loan is but one of many different scenarios that can benefit from the teachings presented herein.

In an embodiment, the network service is the network service 121 of the FIG. 1A.

At 150, the network service automatically initiates a loan application for a home identified in the image having the custom metadata as provided by mobile app 114 of the FIG. 1A over the network 120.

The network service can identify the home from the image by processing the metadata that is included with or provided as a separate file with the image in a number of manners. For example, the network service parses the metadata that accompanies the image for the GPS or physical location of the mobile device 110 when the image was captured. Next, the network service obtains the compass settings provided in the metadata to identify the direction that the camera 111 was facing when the image was captured by the mobile device 110. The network service may also want the gyroscope settings to determining the orientation of the camera 111 when the image was taken (angle with respect to the horizontal). In some cases, the network service may also utilize the camera settings that were used when the image was taken. The network service then calculates the actual physical location of the image as an offset from the known physical location of the mobile device 110 when the image was taken. In some instances, cartographic data (GPS 142) can be utilized to obtain the actual physical location of the image and obtain a true street address of the image. The street address is then used as a search, by the network service, into known real estate data sources 143 (such as Zillow®, Multiple Listing Service (MLS®)), etc.

That is, the network service processes the custom metadata provided with the image from the mobile app 114 and automatically resolves a specific physical address for the image (not for the mobile device 110). Conventionally, it is the address and the physical location of the mobile device that is processed and not the address or physical location of an object in an image that is taken from the mobile device. Images may be geotagged in conventional approaches but that tag is based exclusively on the physical location of the mobile device that takes the picture. This is not what is done in the present teachings; that is, the present teachings provide the techniques for calculating the actual physical location of an image taken by a mobile device using the physical location of the mobile device as an offset for calculating the physical location of the image.

Minimally, the physical location of mobile device 110 is offset by the compass settings in the custom metadata 113 along with perhaps a zoom level or pan level of the camera 111 (providing an estimate as to how far in distance the object captured in the image is from the camera 111 of the mobile device 110) for calculating a physical location of the image.

Once the network service has resolved the physical address of the home (represented in the image) by processing the custom metadata 113, the network service passes the information regarding the home and the user (user data known to the network service and minimally a user id was provided with the custom metadata) to a decision engine at 151.

Although the user may have logged into the network service with a user id and password combination before the image with custom metadata 113 was sent to the network service, additional user information may be required to proceed with the automated home loan processing at 152. So, the network service may ask (through an interface to the mobile app 114) that the user verify that the home address is the home that the user desires to purchase, may ask the user to verify something that only the user may know (such as mother's maiden name), may ask what terms the user desires (such as 15-year fixed, 1-year variable, 7-year balloon payment, etc.), etc.

The decision engine can then identify all the information needed to make a decision on the home loan once the user is identified, the home to be purchased is identified, and the desired terms of the loan are identified. Internal tables can identify the information needed for the user, such as tax information, pay stub information, credit rating, credit history, whether the home is in a flood plan area, etc. In an embodiment, the network service is a bank of the user, such that the network service already has a lot of the needed information in an account history (digital banking 141) for the user.

In some cases, the network service can obtain needed information from a variety of private 122 and public 123 data sources; for example, property liens on property owned by the user or against the home being purchased through public records government services 144 available online. The credit rating and history of the user can be obtained through other online data sources 145, such as credit agencies.

The network service gathers all of the information needed to make a decision and based on internal risk compliance and existing government compliance rules makes an automated decision as to whether the user is to be auto approved 153, auto denied 154, or whether a manual review 155 is needed before a final decision on the home loan can be determined. If any information is unavailable for automatic acquisition (without any manual intervention), such as a tax return, then, at 152, the network service notifies the user through the mobile app 114. The user can then take a photograph of the needed information and send it back to the network service.

The entire process is automated based on the user taking an image of the desired home from within the mobile app 114 and a decision is rendered as to whether or not the user's desired home loan is obtained or not obtained in a matter of minutes as opposed to weeks with the conventional techniques. The network service processes the novel metadata for an image provided within the mobile app 114 to begin and conclude the loan decision. Essentially, a photo snap and transmit process to be approved for a home loan.

Again, it is noted that the home loan processing is but one scenario that can automate consumer transactions by processing novel captured metadata provided with or within an image. Other network services can be enhanced to provide other scenarios, such as booking a vacation rental for a vacation, buying a piece of undeveloped property, obtaining information in real time about a specific object in a specific location (historic, entertainment, etc.), and the like.

These and other embodiments are now discussed with reference to the FIGS. 2-4.

Figure 2:
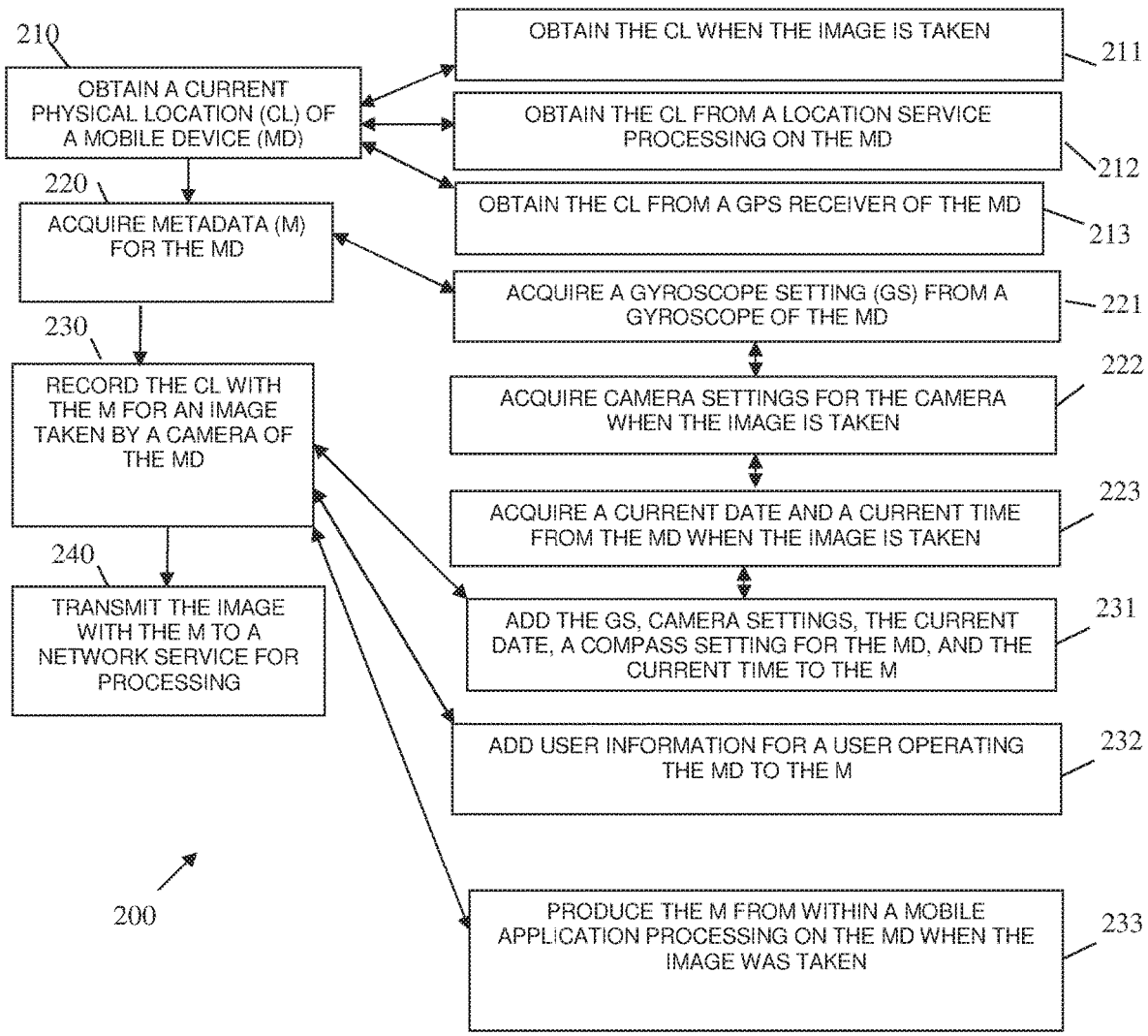
FIG. 2 is a diagram of a method for automated image metadata processing, according to an example embodiment.

FIG. 2 is a diagram of a method 200 for automated image metadata processing, according to an example embodiment. The software module(s) that implements the method 200 is referred to as an "image capture manager." The image capture manager is implemented as executable instructions programmed and residing within memory and/or a non-transitory computer-readable (processor-readable) storage medium and executed by one or more hardware processors of a hardware computing device. The processors of the device that executes the image capture manager are specifically configured and programmed to process the image capture manager. The image capture manager has access to one or more networks during its processing. The networks can be wired, wireless, or a combination of wired and wireless.

In an embodiment, the device that executes the image capture manager is the mobile device 110. In an embodiment, the mobile device 110 is one of: a tablet, a phone, a wearable processing device, a laptop, a network-based camera, and an intelligent appliance.

In an embodiment, the image capture manager is the mobile app 114.

At 210, the image capture manager obtains a current physical location of a mobile device that is processing the image capture manager. This can be done in a variety of manners.

For example, at 211, the image capture manager obtains the current physical location when the image is taken.

In another case, at 212, the image capture manager obtains the current physical location from a location service processing on the mobile device. The location service may use a variety of on-device mechanisms for resolving the current physical location of the mobile device, such as WiFi, cellular triangulation, GPS, etc.

In one case, at 213, the image capture manager obtains the currently physical location from a GPS receiver of the mobile device.

At 220, the image capture manager acquires metadata for the mobile device when the image is captured by the camera of the mobile device. The compass setting providing a direction that the camera was pointing when the image was taken by the mobile device.

According to an embodiment, at 221, the image capture manager acquires a gyroscope setting from a gyroscope of the mobile device. This can provide the orientation of the mobile device with respect to the horizontal when the camera of the mobile device was activated to take the image.

In an embodiment of 221 and at 222, the image capture manager acquires camera settings for the camera when the image is taken. Such settings can include a zoom level and a pan level of the lens when the image was taken from the camera of the mobile device.

In an embodiment of 222 and at 223, the image capture manager acquires a current date and a current time from the mobile device when the image is taken At 230, the image capture manager records the current physical location of the mobile device with the metadata for the image taken by the camera of the mobile device.

In an embodiment of 223 and 230, at 231, the image capture manager adds the gyroscope setting, the camera settings, the current date, a compass setting for the mobile device, and the current time to the metadata.

According to an embodiment, at 232, the image capture manager adds user information for a user operating the mobile device to the metadata.

In an embodiment, at 233, the image capture manager produces the metadata from within a mobile application processing on the mobile device when the image was taken, such as was explained above with mobile application 114.

At 240, the image capture manager transmits or sends the image with the metadata to a network service for downstream and further processing on behalf of a user (such processing described above with reference to the FIG. 1B and below with respect to FIGS. 3-4.

As is appreciated by those of ordinary skill in the art, adding the compass settings with the current physical location to the image metadata provides novel processing capabilities including the ability to accurately calculate a physical location of an object in an image by at least processing the compass settings as an offset from the current physical location of the mobile device that captured the image of the object.

Figure 3:
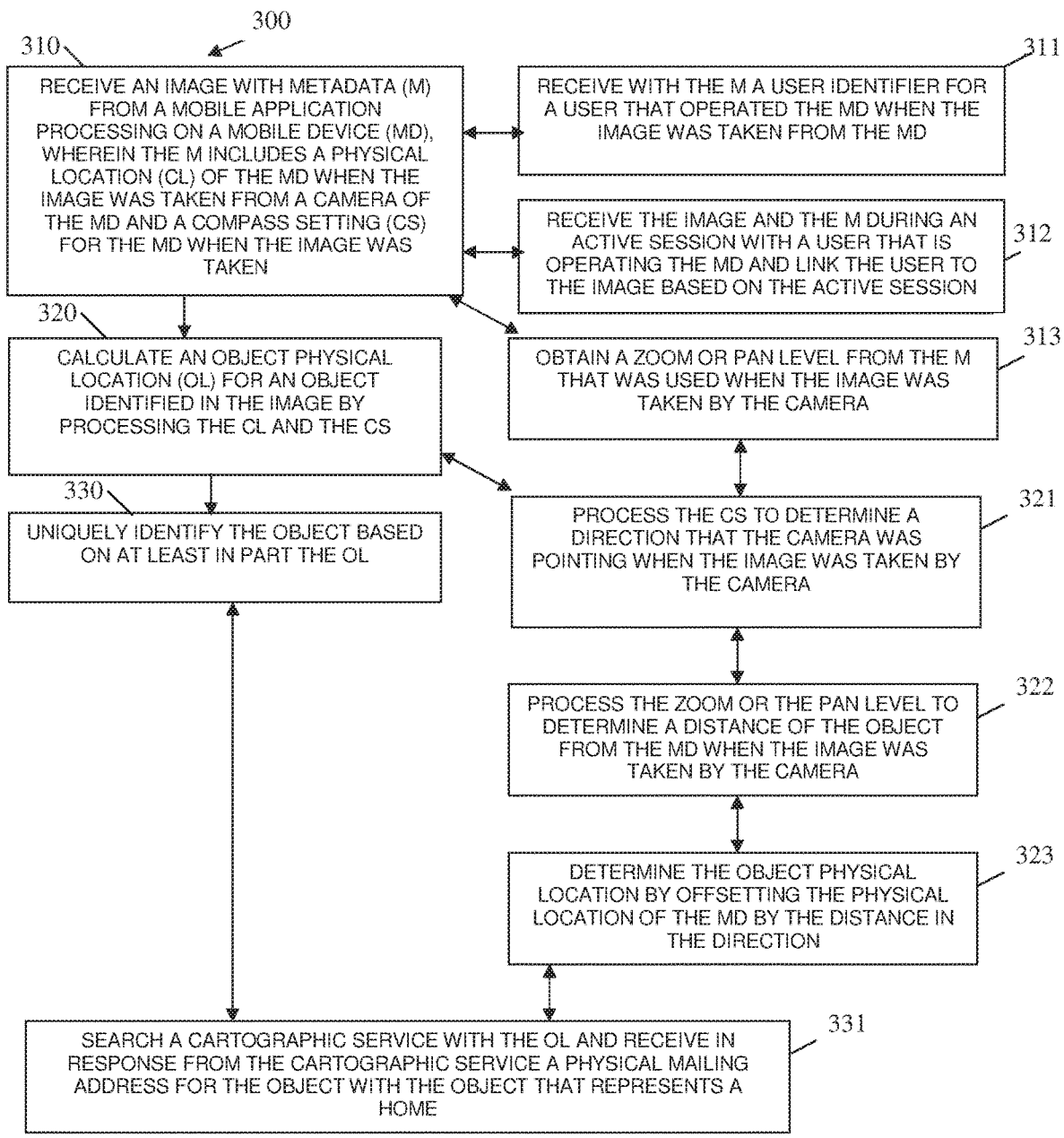
FIG. 3 is a diagram of another method for automated image metadata processing, according to an example embodiment.

FIG. 3 is a diagram of another method for automated image metadata processing, according to an example embodiment. The software module(s) that implements the method 300 is referred to as a "network service." The network service is implemented as executable instructions programmed and residing within memory and/or a non-transitory computer-readable (processor-readable) storage medium and executed by one or more hardware processors of a hardware device. The processors of the device that executes the network service are specifically configured and programmed to process the network service. The network service has access to one or more networks during its processing. The networks can be wired, wireless, or a combination of wired and wireless.

In an embodiment, the device that executes the network service is a server.

In an embodiment, the device that executes the network service is a cloud (a collection of logical servers that can be geographically dispersed from one another).

In an embodiment, the network service is the network service 121.

In an embodiment, the network service is the network service of the method 130 and discussed above with the FIG. 1B.

In an embodiment, the network service is the network service of the method 200 and discussed above with the FIG. 2.

The network service receives an image from a mobile app having novel metadata as discussed above with the FIGS. 1A and 2.

At 310, the network service receives an image with novel and custom metadata from a mobile application processing on a mobile device. The metadata includes a physical location of the mobile device when the image of an object was taken from a camera of the mobile device, and the compass setting for the mobile device when the image was taken.

According to an embodiment, at 311, the network service receives with the metadata a user identifier for a user that operated the mobile device when the image of the object was taken from the camera of the mobile device.

In an embodiment, at 312, the network service receives the image and the metadata during an active communication session with the user who is operating the mobile device and link the user to the image based on the activate session.

In an embodiment, at 313, the network service obtains a zoom and/or pan level that was used when the image was taken by the camera.

At 320, the network service calculates an object physical location from an object identified in the image by processing the physical location and the compass setting.

In an embodiment of 313 and 320, at 321, the network service processes the compass setting to determine a direction that the camera was pointing when the image was taken by the camera.

In an embodiment of 321 and at 322, the network service processes the zoom and/or pan level to determine a physical distance of the object from the mobile device when the image was taken by the camera.

In an embodiment of 322 and at 323, the network service determines the object physical location by offsetting the physical location of the mobile device by the distance in the direction identified by the compass setting.

At 330, the network service uniquely identifies the object based at least in part on the calculated object physical location.

In an embodiment of 323 and 330, at 331, the network service searches a cartographic service with the object physical location and receives back in response from the cartographic service a physical mailing address for the object with the object representing a home/house.

Figure 4:
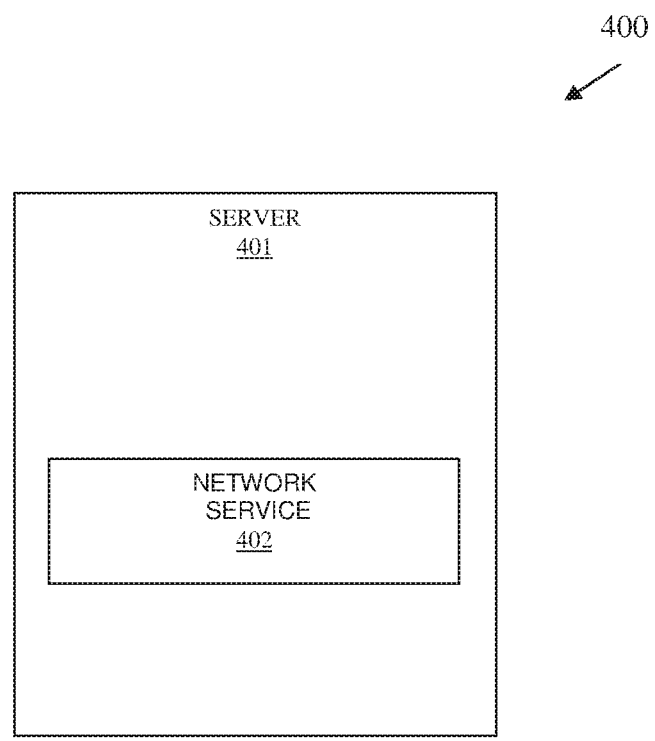
FIG. 4 is a diagram of another system for automated image metadata processing, according to an example embodiment.

FIG. 4 is a diagram of another system 400 for automated image metadata processing, according to an example embodiment. The system 400 includes a variety of hardware components and software components. The software components of the system 400 are programmed and reside within memory and/or a non-transitory computer-readable medium and execute on one or more hardware processors of a hardware device. The system 400 communicates one or more networks, which can be wired, wireless, or a combination of wired and wireless.

In an embodiment, the system 400 implements all or some combination of the processing discussed above with the FIGS. 1A-1B and 2-3.

The system 400 includes a server 401 and the server including a network service 402.

The network service 402 is configured to: 1) execute on at least one hardware processor of the server 401; 2) receive, from a mobile application processing on a mobile device, an image of an object along with metadata including a physical location of the mobile device when the image was taken by a camera of the mobile device and a compass setting of the mobile device when the image was taken; 3) unique identify the object by calculating an object physical location when the image was taken from the physical location and the compass setting, and 4) perform an automated transaction on behalf of a user operating the mobile device based on the uniquely identified object.

In an embodiment, the automated transaction is a request for a home loan and the object is a home uniquely identified by a mailing address In an embodiment, the network service 402 is the network service 121.

In an embodiment, the network service 402 is the network service of the method 130.

In an embodiment, the network service 402 is the network service of the method 300.

In an embodiment, the mobile app is the mobile app 114.

In an embodiment, the mobile app is the method 200.

In an embodiment, the network service 402 is all or some combination of the processing discussed with the FIG. 1B, and the methods 130 and 300.

In an embodiment, the mobile app is all or some combination of the processing discussed with the FIG. 1A and the method 200.

In an embodiment, the server 401 is part of or configured within a cloud processing environment.

In an embodiment, the network service 402 is a server.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   obtaining a current physical location of a mobile device;
   acquiring metadata for the mobile device, wherein acquiring further includes obtaining with the metadata, mobile device settings and camera settings for the mobile device and a camera that captures an image of an object, wherein acquiring further includes discovering the camera settings in real time as the mobile device is operated by processing an Application Programming Interface (API) associated with a camera driver on the mobile device and obtaining through the API the camera settings comprising a zoom level for current zooming, a panning level for current panning, and a pixel density of the image;
   recording the current physical location as part of the metadata;
   transmitting the image with the metadata to a network service for processing, wherein transmitting further includes transacting with the network service in a transaction and purchasing the object identified in the image based on: determining the actual physical location of an object associated with the image by calculating a distance offset from the current physical location of the mobile device when the image was taken to the object represented in the image using: the metadata, cartographic map data, public network data sources available for the current physical location, private network data sources, and verifying information that is unique to a user who operates the mobile device in order to verify the user by using the information as additional information provided by the user that is in addition to a user identifier and password combination provided by the user during a login to the network service, wherein purchasing further includes purchasing the object that is located at the actual physical location; and
   receiving a decision for the transaction from the network service.

2. The method of claim 1, wherein obtaining further includes obtaining the current physical location when the image is taken.

3. The method of claim 1, wherein obtaining further includes obtaining the current physical location from a location service processing on the mobile device.

4. The method of claim 1, wherein obtaining further includes obtaining the current physical location from a Global Positioning Satellite (GPS) receiver of the mobile device.

5. The method of claim 1, wherein acquiring further includes acquiring a gyroscope setting from a gyroscope of the mobile device as a first one of the mobile device settings.

6. The method of claim 5, wherein acquiring further includes acquiring the camera settings for the camera when the image is taken.

7. The method of claim 6, wherein acquiring further includes acquiring a current date and a current time from the mobile device when the image is taken as a second one of the mobile device settings.

8. The method of claim 7, wherein recording further includes adding the gyroscope setting, camera settings, the current date, a compass setting for the mobile device as a third one of the mobile device settings, and the current time to the metadata.

9. The method of claim 1, wherein recording further includes adding user information for the user operating the mobile device to the metadata.

10. The method of claim 1, wherein recording further includes producing the metadata from within a mobile application processing on the mobile device when the image was taken.

11. A method, comprising:
   receiving an image with metadata from a mobile application processing on a mobile device, wherein the metadata includes a physical location of the mobile device when the image was taken from a camera of the mobile device, a compass setting for the mobile device that identifies a direction of the camera when the image was taken, a gyroscope setting for the mobile device that identifies an orientation of the camera when the image was taken, and camera settings in use by the camera when the image was taken, wherein receiving further includes discovering the camera settings in real time as the mobile device is operated by processing an Application Programming Interface (API) associated with a camera driver on the mobile device and obtaining through the API the camera settings comprising a zoom level for current zooming, a panning level for current panning, and a pixel density of the image;
   calculating an object physical location for an object identified in the image by determining the actual physical location of the object by calculating a distance offset from the physical location of the camera when the image was taken to the object based on the compass setting, the gyroscope setting, the camera settings, and cartographic map data associated with the object physical location;

uniquely identifying the object based on the object physical location and the cartographic data, wherein uniquely identifying further includes searching public network data sources associated with the object physical location and private network data sources;

transacting, by the mobile application, with a network service in a transaction and purchasing the object that is located at the object physical location after verifying, by the network service, information that is unique to a user who operates the mobile device in order to verify the user by using the information as additional information provided by the user that is in addition to a user identifier and password combination provided by the user during a login to the network service; and receiving, by the mobile application, a decision for the transaction.

12. The method of claim 11, wherein receiving further includes receiving with the metadata the user identifier for the user that operated the mobile device when the image was taken from the mobile device.

13. The method of claim 11, wherein receiving further includes receiving the image and the metadata during an active session with the user that is operating the mobile device and linking the user to the image based on the active session.

14. The method of claim 11, wherein calculating further includes processing the compass setting to determine the direction that the camera was pointing when the image was taken by the camera.

15. The method of claim 14, wherein calculating further includes processing the zoom level and the panning level to determine the distance offset for the object from the physical location of the mobile device when the image was taken by the camera within the cartographic map data.

16. The method of claim 15, wherein calculating further includes determining the object physical location by offsetting the physical location of the mobile device by the distance offset in the direction within the cartographic map data.

17. The method of claim 16, wherein uniquely identifying further includes searching a cartographic service with the object physical location and receiving in response from the cartographic service a physical mailing address for the object with the object that represents a home.

* * * * *